(12) United States Patent
Hamada et al.

(10) Patent No.: US 10,574,163 B2
(45) Date of Patent: Feb. 25, 2020

(54) THREE-PHASE NEUTRAL-POINT-CLAMPED POWER CONVERSION DEVICE

(71) Applicant: MEIDENSHA CORPORATION, Tokyo (JP)

(72) Inventors: Shizunori Hamada, Numazu (JP); Kenji Kobori, Shizuoka (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/516,985

(22) PCT Filed: Oct. 7, 2015

(86) PCT No.: PCT/JP2015/078446
§ 371 (c)(1),
(2) Date: Apr. 5, 2017

(87) PCT Pub. No.: WO2016/063723
PCT Pub. Date: Apr. 28, 2016

(65) Prior Publication Data
US 2017/0302206 A1    Oct. 19, 2017

(30) Foreign Application Priority Data
Oct. 20, 2014    (JP) .................................. 2014-213279

(51) Int. Cl.
*H02P 21/14* (2016.01)
*H02M 7/487* (2007.01)
(Continued)

(52) U.S. Cl.
CPC .............. *H02P 21/14* (2013.01); *H02M 1/08* (2013.01); *H02M 5/4585* (2013.01);
(Continued)

(58) Field of Classification Search
CPC ...... H02P 21/0003; H02P 21/14; H02M 1/08; H02M 5/4585
(Continued)

(56) References Cited

U.S. PATENT DOCUMENTS

| 5,274,542 A | * | 12/1993 | Tanaka | .................. | H02M 7/487 |
|   |   |   |   |   | 363/96 |
| 5,790,396 A | * | 8/1998 | Miyazaki | .............. | H02M 7/487 |
|   |   |   |   |   | 363/96 |

(Continued)

FOREIGN PATENT DOCUMENTS

| EP | 0 874 448 A1 | 10/1998 |
| EP | 2 437389 A2 | 4/2012 |

(Continued)

OTHER PUBLICATIONS

S. Busquets-Monge et al., Closed-Loop Control Design for a Three-Level Three-Phase Neutral-Point-Clamped Inverter Using the Optimized Nearest-Three Virtual-Space-Vector Modulation, Power Electronics Specialists Conference, 37th IEEE JEJU, Jun. 2006, 7 pages.

(Continued)

*Primary Examiner* — Jorge L Carrasquillo
*Assistant Examiner* — Devon A Joseph
(74) *Attorney, Agent, or Firm* — Foley & Lardner LLP

(57) ABSTRACT

Current control section 2 performs PI control based on deviation between d-axis command current Id_cmd and d-axis detected current Id_det and deviation between q-axis command current Iq_cmd and q-axis detected current Iq_det. Neutral point potential control section 4 calculates corrected command voltage V_cmd' by addition of neutral point control compensation quantity V_cmp to three-phase command voltage V_cmd. Limiter LMT3 outputs limiter processed command voltage V_cmd" by liming the output of (Continued)

corrected command voltage V_cmd'. Three-phase to two-phase converter 5 outputs feedback quantities Vd_back, Vq_back by three-phase to two-phase conversion of the limiter processed command voltage V_cmd". Current control section 2 performs integral control in accordance with quantities resulting from addition of the feedback quantities Vd_back, Vq_back to the deviations. Accordingly, the three-phase neutral point clamed power conversion apparatus performing the PWM control suppresses interference between the current control and the neutral point potential control.

18 Claims, 4 Drawing Sheets

(51) Int. Cl.
    *H02P 21/06*     (2016.01)
    *H02P 21/22*     (2016.01)
    *H02P 27/14*     (2006.01)
    *H02M 1/08*     (2006.01)
    *H02M 5/458*     (2006.01)
    *H02P 21/00*     (2016.01)

(52) U.S. Cl.
    CPC ........ *H02M 7/487* (2013.01); *H02P 21/0003* (2013.01); *H02P 21/06* (2013.01); *H02P 21/22* (2016.02); *H02P 27/14* (2013.01)

(58) Field of Classification Search
    USPC ......................................................... 318/400
    See application file for complete search history.

(56) References Cited

U.S. PATENT DOCUMENTS

| | | | |
|---|---|---|---|
| 9,088,232 B2* | 7/2015 | Marcinkiewicz ... | H02M 1/4225 |
| 9,257,934 B2 | 2/2016 | Hamada et al. | |
| 9,780,692 B2* | 10/2017 | Hasegawa ............. | H02M 7/487 |
| 9,954,475 B2* | 4/2018 | Cho ........................ | H02P 27/06 |
| 2009/0244945 A1* | 10/2009 | Hatanaka ................ | H02M 7/23 363/127 |
| 2011/0134672 A1* | 6/2011 | Sato ........................ | H02M 1/10 363/126 |
| 2011/0304290 A1* | 12/2011 | Ito ........................... | H02P 6/185 318/400.32 |
| 2012/0127765 A1* | 5/2012 | Maruyama .............. | H02J 50/12 363/126 |
| 2013/0009574 A1* | 1/2013 | Yoo ........................ | H02P 21/06 318/400.02 |
| 2014/0152209 A1* | 6/2014 | Marcinkiewicz ... | H02M 1/4225 318/400.3 |
| 2014/0334204 A1* | 11/2014 | Hamada ................. | H02P 27/085 363/71 |
| 2016/0028301 A1* | 1/2016 | Murakami ................ | H02J 3/01 363/41 |

FOREIGN PATENT DOCUMENTS

| | | |
|---|---|---|
| JP | 1-298959 A | 1/1989 |
| JP | 6-233537 A | 8/1994 |
| JP | 9-172783 A | 6/1997 |
| JP | 10-248262 A | 9/1998 |
| JP | 2003-111433 A | 4/2003 |
| JP | 2011-239564 A | 11/2011 |
| WO | WO 97/25766 A1 | 7/1997 |
| WO | WO 2013/105382 A1 | 7/2013 |

OTHER PUBLICATIONS

Sangin Lee et al., Phase-Shifted Modulation Strategy for Voltage Balancing in Neutral-Point Clamped Converter, IEEE Applied Power Electronics Conference and Exposition—APEC 2014, IEEE, Mar. 16, 2014, 7 pages.

European Search Report, dated Apr. 24, 2016, 12 pages.

* cited by examiner

THREE-PHASE NEUTRAL-POINT-CLAMPED POWER CONVERSION DEVICE

TECHNICAL FIELD

The present invention relates to a three-phase neutral point clamped power conversion apparatus and specifically to current control using PWM control.

BACKGROUND ART

FIG. 6 is a block diagram showing a main circuit of a three-phase neutral point clamped power conversion apparatus connected with a load in the form of a motor. The power conversion apparatus controls switching devices S1~S12 (IGBTs in FIG. 6) ON/OFF by inputting gate commands to the switching devices S1~S12, and thereby outputs an ac voltage at output terminals U, V and W.

This power conversion apparatus is arranged to divide a dc voltage P-N by the use of smoothing capacitors Cdc1 and Cdc2, and to produce an output with a PWM (Pulse Width Modulation) of dc potentials P and N and a neutral point potential NP at three levels.

Patent documents 1 and 2 both employ a neutral point potential control (Neutral Point Control) for suppressing unevenness in the dc voltages Vdc1 and Vdc2 after ACR (current control: Automatic Current Regulator). The neutral point potential control is a control to determine a deviation between the dc voltage Vdc1 of smoothing capacitor Cdc1 on the positive side (P side) of the dc voltage P-N and the dc voltage Vdc2 of the smoothing capacitor Cdc2 on the negative side (N side), and to perform a control operation to reduce the deviation toward zero.

A control circuit of the power conversion apparatus is explained hereinbelow in the example in which the three-phase ac output of this power conversion apparatus is connected to the load in the form of a motor M, and a current control is performed. FIG. 7 is a block diagram showing the control circuit of the three-phase neutral point clamped power conversion apparatus.

A phase detector enc is attached to the motor M and arranged to detect a phase and to provide a detected phase theta_det. A three-phase to two-phase converter 1 converts output currents (motor currents) Iu, Iv, Iw by three-phase to two-phase conversion on the basis of the detected phase theta_det, and thereby provides detected d-axis current Id_det and q-axis current Iq_det.

Then, a current control section 2 performs a PI control to cause the detected d-axis current Id_det and detected q-axis current Iq_det to follow respective target values set equal to a command d-axis current Id_cmd and a command q-axis current Iq_cmd, respectively. On the output side of the PI control, there are provided limiters LMT1 and LMT2 for restraining integral outputs at the time of output saturation and thereby stabilizing the system. The output of current control section 2 is a two-phase command voltage of Vd_cmd and Vq_cmd.

The two-phase command voltage Vd_cmd, Vq_cmd is converted, by the two-phase to three-phase conversion with a two-phase to three-phase converter 3, into a three-phase command voltage V_cmd. Next, a neutral point potential control section 4 adds a neutral point potential compensation quantity V_cmp to the three-phase command voltage V_cmd, and thereby delivers the command voltage obtained by the addition as a corrected command voltage V_cmd'.

Furthermore, a limiter LMT3 imposes voltage limitation on the corrected command voltage Vcmd' and supplies a limiter processed command voltage Vcmd" obtained by the voltage limitation, to a PWM process section PWM. The limiter LMT3 is provided to prevent later-mentioned gate commands GI_H and GI_L from becoming abnormal pulse (minimal pulse, for example) and to prevent the output voltage and output current of the power conversion apparatus from being distorted.

The PMW process section PWM produces gate commands GI_H, GI_L for each of switching devices S1~S12 by using the limiter processed command voltage Vcmd". Generally, the gate commands GI_H, GI_L are produced by comparison between a triangular wave carrier signal and the limiter processed command voltage V_cmd", though not shown in FIG. 7.

The three-phase to two-phase conversion in the three-phase to two-phase converter 1, and the two-phase to three-phase conversion in the two-phase to three-phase converter 3 are represented by following expressions (1) and (2).

[Math. 1]

$$[C_{dq}] = \sqrt{\frac{2}{3}} \begin{bmatrix} \cos\theta & \sin\theta \\ -\sin\theta & \cos\theta \end{bmatrix} \cdot \begin{bmatrix} 1 & -1/2 & -1/2 \\ 0 & \sqrt{3}/2 & -\sqrt{3}/2 \end{bmatrix} \quad (1)$$

$$[C_{dq\_inv}] = [C_{dq}]^{-1} \quad (2)$$

The limiters LMT1 and LMT2 are provided at the output of the PI control for stabilizing the current control, and thereafter the neutral point potential compensation quantity V_cmp is added to the three-phase command voltage V_cmd in the configuration of FIG. 7. The corrected command voltage V_cmd' after the addition is inputted to the limiter LMT3 before the PWM process. When the corrected command voltage V_cmd' reaches a threshold value, the limiter processed command voltage V_cmd" is subjected to the voltage limitation. Therefore, the effective value of the output voltage of the power conversion apparatus (the voltage between U and V terminals of FIG. 6, for example) is unable to retain the linearity. Moreover, when the time of the voltage limitation becomes long, the effective value of the output current of the power conversion apparatus too loses the linearity and the operation becomes unstable.

This is because the current control includes the integral action. The integral action functions to amplify the deviation with elapse of time. However, because of the limitation of the output voltage, the deviation is not reduced, and the integral action becomes excessive for amplifying the command output voltage. Consequently, the effective value of the output current loses the linearity. This phenomenon is referred to as windup. When the output currents Iu, Iv and Iw at the time of occurrence of windup are observed on the frequency axis, there appears an offset of a wide bandwidth of several Hz to several hundreds Hz. That is, many undesired fluctuation or vibrations are involved in the currents.

The current control is performed on the d, q axes. However, the system does not work properly by performing the anti-windup process (for suppressing the windup) of the ACR directly without modification. The corrected command voltage V_cmd' is produced by superimposing the neutral point potential compensation quantity V_cmp on the three-phase command voltage V_cmd, and the command voltage limitation is performed by the limiter LMT3. Consequently, the corrected command voltage V_cmd' reaches the threshold voltage, the voltage limitation is imposed on the limiter processed command voltage V_cmd", and hence the system cannot perform the anti-windup process correctly.

In the illustrated example, the limiters LMT1 and LMT2 are provided on the output side of the current control section 2. In general, the capacitances of smoothing capacitors Cdc1 and Cdc2 shown in FIG. 6 are set equal to each other. However, the initial charge quantities of smoothing capacitors Cdc1 and Cdc2 are not equal to each other because of nonuniformity caused by the production process and aging degradation. Therefore, there arises a deviation between the dc voltages Vdc1 and Vdc2, and the neutral point potential compensation quantity V_cmp is increased. Especially, the motor M requires a large output current at the time of start of the motor. Therefore, the superimposition of the neutral point potential compensation quantity V_cmp at the time of start tends to cause an increase of the corrected command voltage V_cmd' to the threshold value and the limitation on the limiter processed command voltage V_cmd", and thereby impedes the stable operation. It is possible to avoid the limitation on the limiter processed command voltage V_cmd" by decreasing the gain of the current control or the neutral point potential control. However, the trade-off for avoiding the limitation is a decrease of the control performance in the steady state. Accordingly, a control mechanism is required for considering interference between the current control and the neutral point potential control without decreasing the gain of the neutral point potential control.

Furthermore, in the case in which the load of the power conversion apparatus is an induction machine or a synchronous machine, the occurrence of the windup could cause fluctuation of torque like the fluctuation of the output current.

As explained above, the problem is to suppress interference between the current control and the neutral point potential control in the three-phase neutral point clamped power conversion apparatus performing the PWM control.

PRIOR ART DOCUMENTS

Patent Documents

Patent Document 1: WO 97/25766
Patent Document 2: JP H06-233537A
Patent Document 3: JP H10-248262A

SUMMARY OF THE INVENTION

The present invention has been devised in view of the above-mentioned problems. According to one aspect of the present invention, a three-phase neutral point clamped power conversion apparatus comprises, as a control circuit, a first three-phase to two-phase converter to convert a three-phase detected current to a two-phase detected current of a d-axis detected current and a q-axis detected current; a current control section configured to calculate a two-phase command voltage with a current control function of performing a PI control in accordance with a deviation between a d-axis command current and the d-axis detected current and a deviation between a q-axis command current and the q-axis detected current; a two-phase to three-phase converter configured to convert the two-phase command voltage to a three-phase command voltage; a neutral point potential control section configured to calculate a neutral point control compensation quantity in accordance with a deviation between a positive side dc voltage and a negative side dc voltage, and to add the neutral point control compensation quantity to the three-phase command voltage thereby to calculate a corrected command voltage; a limiter configured to output a limiter processed command voltage by liming the corrected command voltage to or below a threshold value; and a second three-phase to two-phase converter configured to output a feedback quantity by three-phase to two-phase conversion of the limiter processed command voltage; the current control section being configured to perform an integral control in accordance with the feedback quantity resulting from the three-phase to the two-phase conversion, the deviation between the d-axis command current and the d-axis detected current and the deviation between the q-axis command current and the q-axis detected current.

According to another aspect of the present invention, a load to which a three-phase ac output produced by the power conversion apparatus is supplied is a motor; the second three-phase to two-phase converter is configured to convert the limiter processed command voltage to the feedback quantity in accordance with a detected phase of the motor; the two-phase to three-phase converter is configured to convert the two-phase command voltage to the three-phase command voltage in accordance with the detected phase of the motor; and the first three-phase to two-phase converter is configured to convert a three-phase output current to the d-axis detected current and the q-axis detected current in accordance with the detected phase of the motor.

According to still another aspect of the present invention, the power conversion apparatus is interconnected with a system; the second three-phase to two-phase converter is configured to convert the limiter processed command voltage to the feedback quantity in accordance with a detected phase of the system; the two-phase to three-phase converter is configured to convert the two-phase command voltage to the three-phase command voltage in accordance with the detected phase of the system; and the first three-phase to two-phase converter is configured to convert a three-phase system current to the d-axis detected current and the q-axis detected current in accordance with the detected phase of the system.

According to still another aspect of the present invention, the corrected command voltage is determined by addition of the neutral point control compensation quantity to a quantity resulting from subtraction of a zero-phase command voltage from the three-phase command voltage outputted by the two-phase to three-phase converter.

In the three-phase neutral point clamped power conversion apparatus to perform the PWM control, it is possible to suppress interference between the current control and the neutral point potential control, according to the present invention.

MODES FOR CARRYING OUT THE INVENTION

FIGS. 1-5 are views for explaining in detail the three-phase neutral point clamped power conversion apparatus of the present invention in embodiments 1~4.

Embodiment 1

Figure 1:
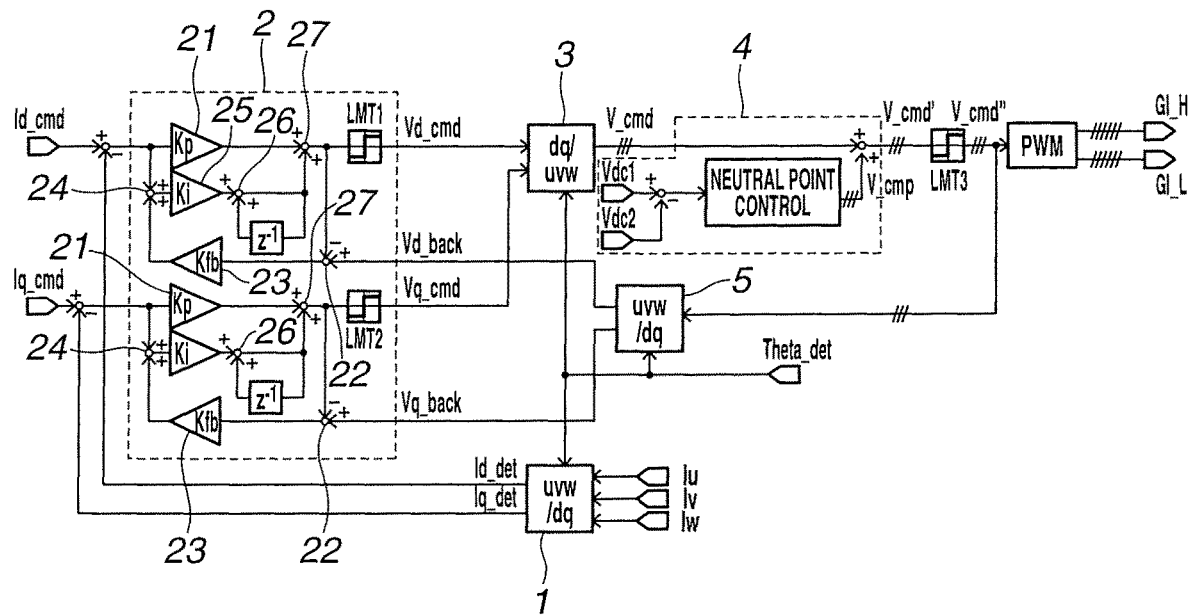
FIG. 1 is a block diagram showing a control circuit according to an embodiment 1.

FIG. 1 is a block diagram showing a control circuit of the power conversion apparatus according to the embodiment 1. The control circuit of the embodiment 1 is designed in consideration of interference between the current control and the neutral point potential control.

Figure 7:
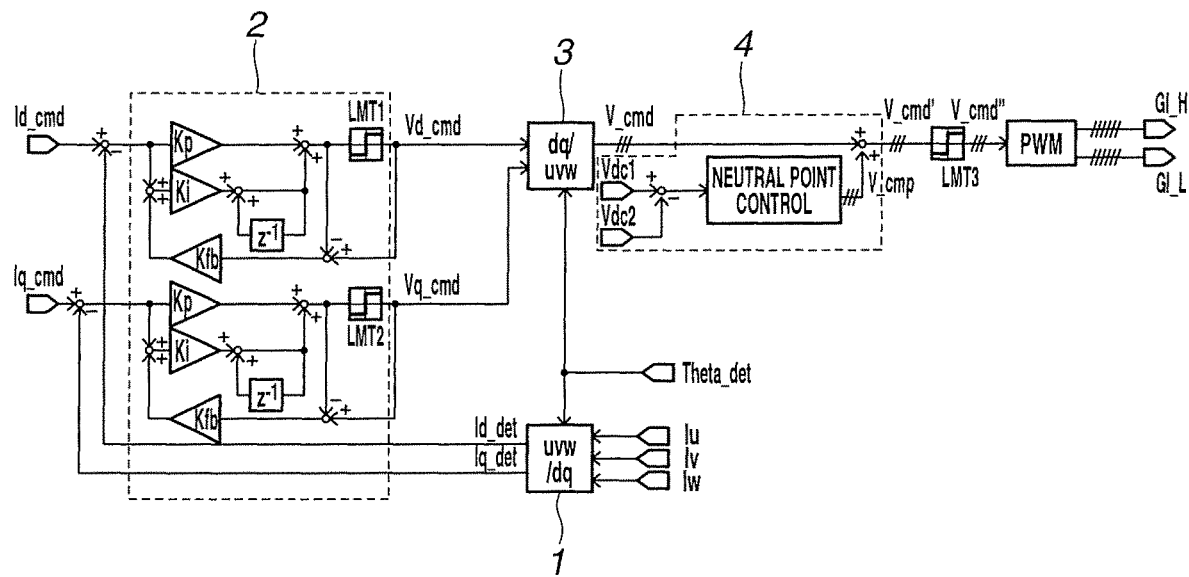
FIG. 7 is a block diagram showing, as an example, a control circuit of earlier technology.

In FIG. 7, the limiters LMT1 and LMT2 are provided on the output side of the PI control, and the control circuit is arranged to restrain the integration by using the deviation between values before and after each limiter. In the control circuit of FIG. 1, on the other hand, a three-phase to two-phase converter or converting section 5 is arranged to perform a three-phase to two-phase conversion on the limit processed command voltage V_cmd" to be finally inputted into the PWM control section PWM. The limit processed command voltage V_cmd" thus converted to the two-phase from the three-phase is used as feedback quantities Vd_back and Vq_back. The control circuit of FIG. 1 restrains the integration by feeding back to the input of an integrating section 25, the deviation between the feedback quantity Vd_back or Vq_back and the input into the limiter LMT1 or LMT2 of the current control section 2.

The current control section 2 according to the embodiment 1 is constructed as follows. A proportional section 21 multiplies the deviation between the command current Id_cmd and the detected current Id_det, by a proportional gain Kp.

A subtracting section 22 outputs the deviation between the feedback quantity Vd_back or Vq_back and the input of the limiter LMT1 or LMT2 of the current control section 2. A feedback gain section 23 multiplies the output of subtracting section 22 by a feedback gain Kfb.

An adding section 24 adds the output of feedback gain section 23 to the deviation between command current Id_cmd and the detected current Id_det. The integrating section 25 multiplies the output of adding section 24 by an integral gain Ki. An adding section 26 adds the output of integrating section 25 and the previous output of adding section 26 one calculating cycle before. An adding section 27 adds the output of proportional section 21 and the output of adding section 26, and outputs the result of the addition to the limiter LMT1 and the subtracting section 22.

Although the above explanation is directed only to the process of the d-axis in current control section 2, the process section on the q-axis is identical to the process section on the d-axis. The control circuit of FIG. 1 is the same as the circuit of FIG. 7 except for the current control section 2 and three-phase to two-phase converter 5.

The feedback quantities Vd_back and Vq_back are the quantities after the two-phase to three-phase conversion, and accordingly the feedback quantities are not influenced by the neutral point potential compensation quantity V_cmp which is the component of the zero phase. Therefore, the current control and neutral point potential control do not interfere with each other. Moreover, the limiter LMT3 before the PWM process limits the limit processed command voltage V_cmd" even if the corrected command voltage V_cmd' reaches the threshold value, and accordingly, the feedback quantities Vd_back and Vq_back are also limited. Therefore, the system can restrain the integral action and perform the current control stably.

As mentioned above, the three-phase neutral point clamp type power conversion apparatus according to the embodiment 1 can perform the neutral point potential control and suppress undesired current fluctuation even if the corrected command voltage V_cmd' reaches the threshold value and the limiter operation is performed.

Moreover, when the motor load is connected, the apparatus can prevent torque fluctuation by preventing the current fluctuation. When a system is connected, the apparatus can improve the stability of the system power source by preventing the current fluctuation.

Embodiment 2

Figure 2:
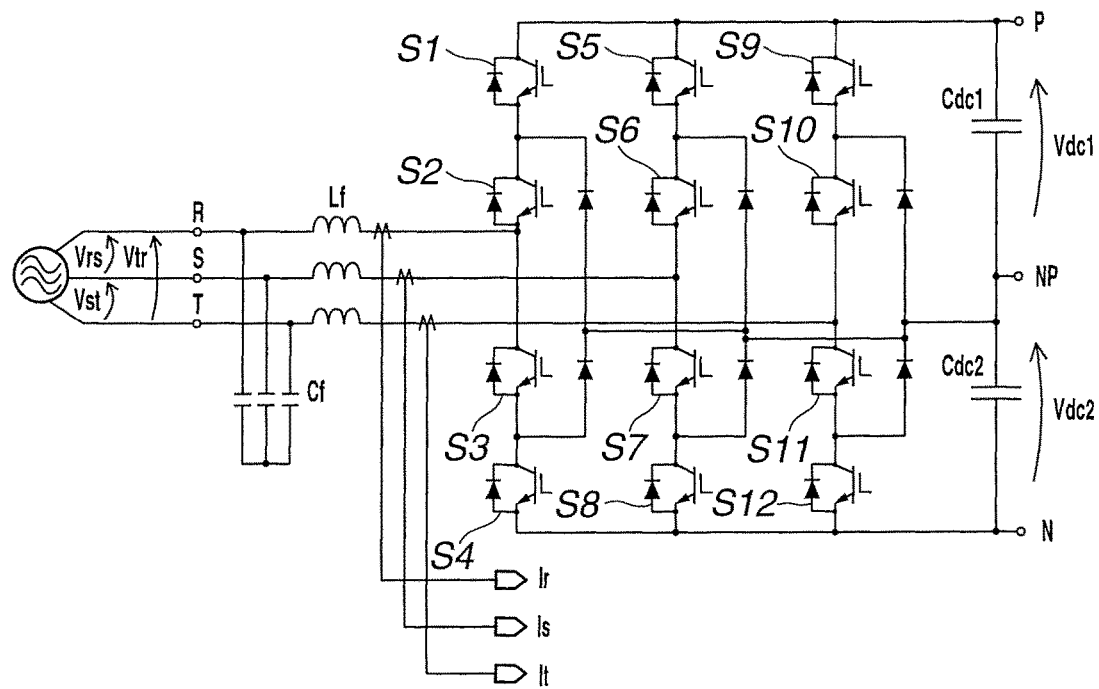
FIG. 2 is a main circuit diagram of a three-phase neutral point clamped power conversion apparatus interconnected with a system.

In the embodiment 2, the apparatus is interconnected with a system and arranged to control dc voltages Vdc1 and Vdc2. FIG. 2 is a diagram of a main circuit of the three-phase neutral point clamped power conversion apparatus connected with the system. Between three-phase system voltages Vrs, Vst, Vtr and the three-phase neutral point clamped power conversion apparatus, there are provided input filters Lf, Cf.

Figure 3:
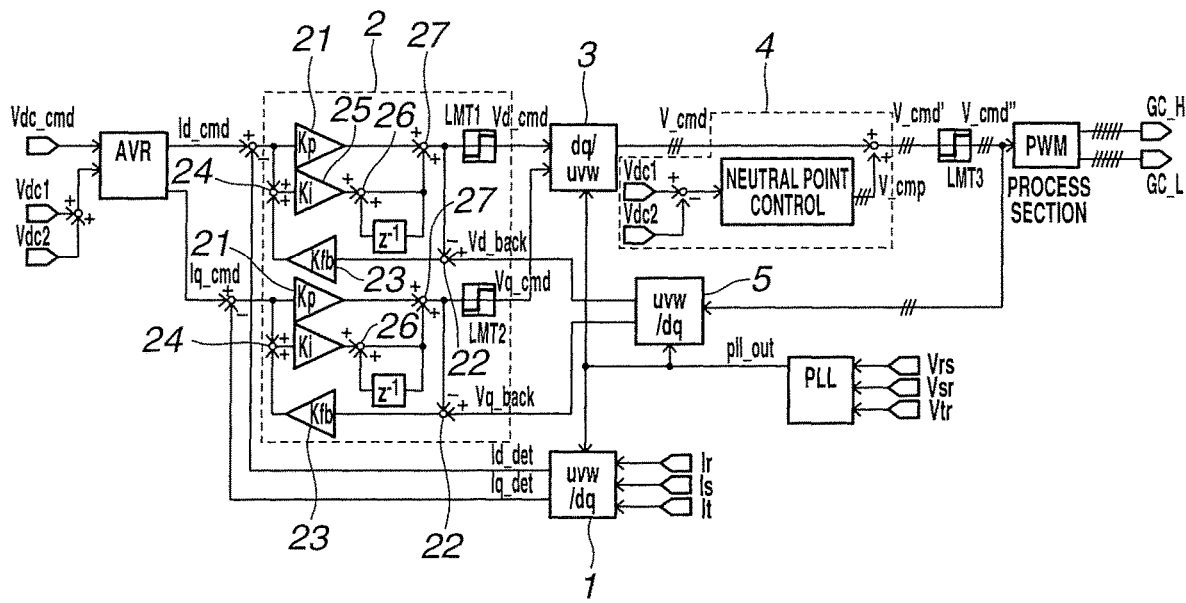
FIG. 3 is a block diagram showing a control circuit according to an embodiment 2.

FIG. 3 is a block diagram showing a dc voltage control and a current control of FIG. 2. The system voltages Vrs, Vst and Vtr are measured by using the voltage Vrs as a reference voltage in FIGS. 2 and 3, and the phase of the system or system phase pll_out is determined by using PLL (Phase Locked Loop) circuit.

The system phase pll_out is used in the three-phase to two-phase converters or converting sections 1 and 5 and the two-phase to three-phase converter or converting section 3. In the embodiment 2, the three-phase to two-phase converter 1 converts the system currents Ir, Is, It to the detected currents Id_det, Iq_det on the basis of the system phase pll_out. The two-phase to three-phase converter 3 converts the two-phase command voltage Vd_cmd to the three-phase command voltage V_cmd on the basis of the system phase pll_out. The three-phase to two-phase converter 5 converts the limit processed command voltage V_cmd" to the feedback quantities Vd_back and Vq_back on the basis of the system phase pl_out.

Moreover, in the embodiment 2, the command currents Id_cmd and Iq_cmd used for the current control are determined by determining a deviation between the dc command voltage Vdc_cmd (the command of voltage across the PN terminals in FIG. 2) and the sum of the dc voltages Vdc1 and Vdc2, and applying AVR (voltage control: Automatic Voltage Regulator). The configuration of AVR is shown in Patent Document 2. In the other respects, the embodiment 2 is the same as the embodiment 1.

The apparatus according to the embodiment 2 can prevent interference between the current control and the neutral point potential control, restrain the integral action and thereby provide a stable control characteristic despite the limitation often imposed on the limiter processed command voltage V_cmd" when the corrected command voltage V_cmd' reaches the threshold at the time of voltage increasing operation of the power conversion apparatus.

Embodiment 3

Figure 4:
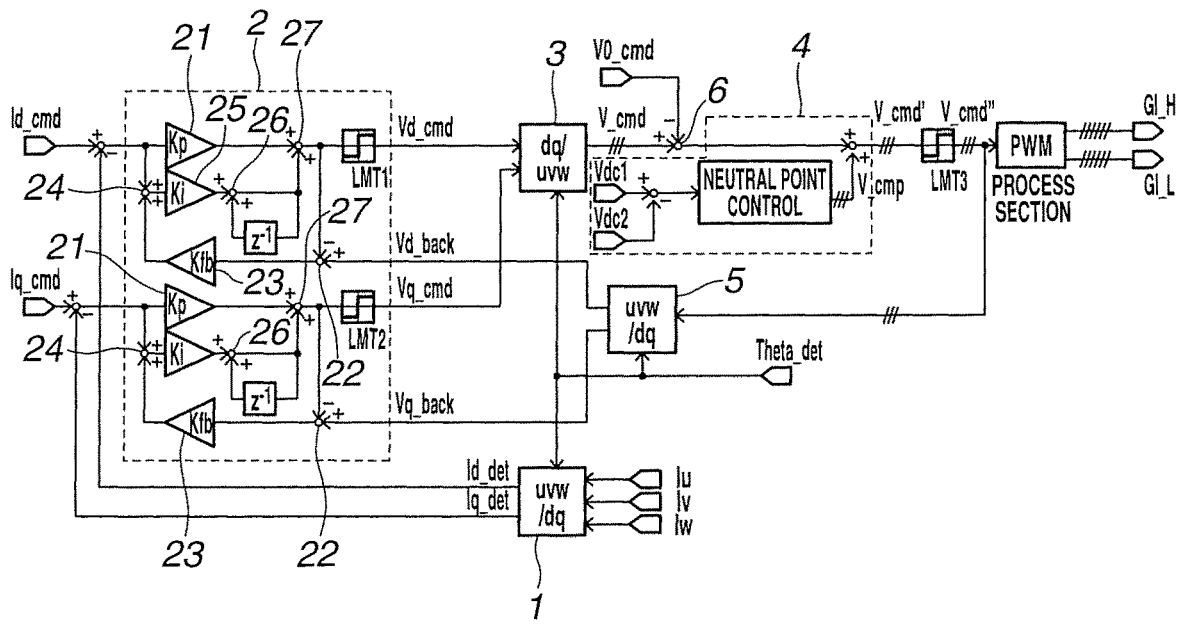
FIG. 4 is a block diagram showing a control circuit according to an embodiment 3.

In the embodiment 3, a zero-phase modulation is added to the control circuit of the embodiment 1 in order to increase the range of the output voltage of the power conversion apparatus. FIG. 4 shows the control circuit according to the embodiment 3.

The method of the zero-phase modulation is explained in Patent Document 3, so that the detailed explanation is omitted here. In FIG. 4, a subtracting section 6 subtracts a zero-phase command voltage V0_cmd from the three-phase command voltage V_cmd, and thereafter the neutral point potential control is performed. The feedback quantities Vd_back and Vq_back can be calculated in the same manner as in the embodiment 1. Since the feedback quantities Vd_back and Vq_back after the three-phase to two-phase conversion are mathematically independent from the zero-phase voltage, there arises no problem. The zero-phase command voltage V0_cmd of FIG. 4 corresponds to a voltage command correction signal shown in (b) of FIG. 2 of Patent Document 3.

Embodiment 4

Figure 5:
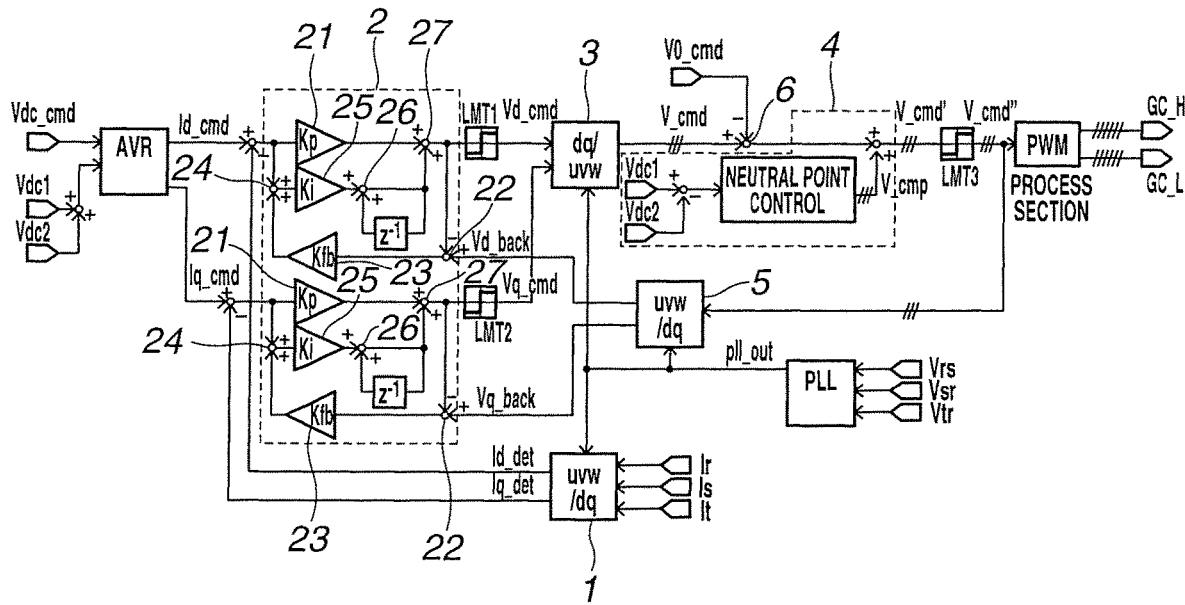
FIG. 5 is a block diagram showing a control circuit according to an embodiment 4.
Figure 6:
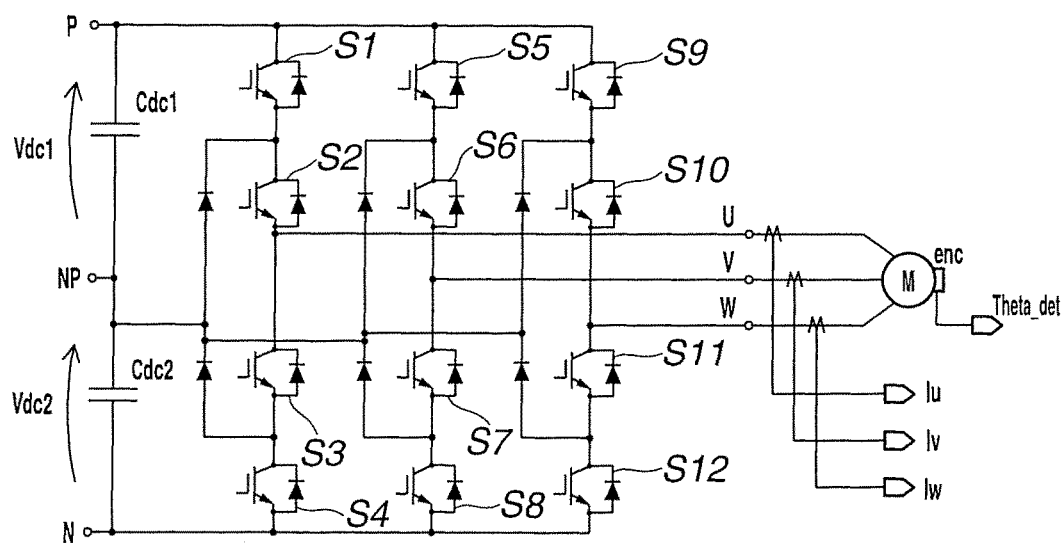
FIG. 6 is a main circuit diagram of a three-phase neutral point clamped power conversion apparatus connected with a motor load.

In the embodiment 4, the zero-phase modulation is added to the control circuit of the embodiment 2 in order to increase the range of the output voltage of the power conversion apparatus. FIG. 5 shows the control circuit according to the embodiment 4.

In FIG. 5, the subtracting section 6 subtracts the zero-phase command voltage V0_cmd from the three-phase command voltage V_cmd, and thereafter the neutral point potential control is performed. The feedback quantities Vd_back and Vq_back can be calculated in the same manner as in the embodiment 1. The zero-phase command voltage of FIG. 5 corresponds to the voltage command correction signal shown in (b) of FIG. 2 of Patent Document 3.

Although the invention has been described above by reference to certain embodiments of the invention, various modifications and variations are possible within the purview of the invention as apparent to those skilled in the art. These modifications and variations are within the scope of the claimed invention.

The invention claimed is:

1. A three-phase neutral point clamped power conversion apparatus comprising a control circuit which comprises:
a first three-phase to two-phase converter configured to convert a three-phase detected current to a two-phase detected current of a d-axis detected current and a q-axis detected current;
a current control section configured to calculate a two-phase command voltage with a current control function of performing a PI control in accordance with a deviation between a d-axis command current and the d-axis detected current and a deviation between a q-axis command current and the q-axis detected current;
a two-phase to three-phase converter configured to convert the two-phase command voltage to a three-phase command voltage;
a neutral point potential control section configured to calculate a neutral point control compensation quantity in accordance with a deviation between a positive side dc voltage and a negative side dc voltage, and to add the neutral point control compensation quantity to the three-phase command voltage thereby to calculate a corrected command voltage;
a limiter configured to output a limiter processed command voltage by limiting the corrected command voltage to or below a threshold value; and
a second three-phase to two-phase converter configured to output a feedback quantity by three-phase to two-phase conversion of the limiter processed command voltage;
the current control section being configured to perform an integral control in accordance with the feedback quantity resulting from the three-phase to the two-phase conversion, the deviation between the d-axis command current and the d-axis detected current and the deviation between the q-axis command current and the q-axis detected current,
wherein the limiter is configured to output the limiter processed command voltage to a processor to perform pulse width modulation processing, and
wherein the limiter is configured to receive the corrected command voltage after a neutral point potential compensation quantity is added but before the processor performs the pulse width modulation processing.

2. The three-phase neutral point clamped power conversion apparatus as claimed in claim 1, wherein a load to which a three-phase ac output produced by the power conversion apparatus is supplied is a motor;
the second three-phase to two-phase converter is configured to convert the limiter processed command voltage to the feedback quantity in accordance with a detected phase of the motor;
the two-phase to three-phase converter is configured to convert the two-phase command voltage to the three-phase command voltage in accordance with the detected phase of the motor; and
the first three-phase to two-phase converter is configured to convert a three-phase output current to the d-axis detected current and the q-axis detected current in accordance with the detected phase of the motor.

3. The three-phase neutral point clamped power conversion apparatus as claimed in claim 1, wherein the power conversion apparatus is interconnected with a system;
the second three-phase to two-phase converter is configured to convert the limiter processed command voltage to the feedback quantity in accordance with a detected phase of the system;
the two-phase to three-phase converter is configured to convert the two-phase command voltage to the three-phase command voltage in accordance with the detected phase of the system; and
the first three-phase to two-phase converter is configured to convert a three-phase system current to the d-axis detected current and the q-axis detected current in accordance with the detected phase of the system.

4. The three-phase neutral point clamped power conversion apparatus as claimed in claim 1, wherein the corrected command voltage is determined by addition of the neutral point control compensation quantity to a quantity resulting from subtraction of a zero-phase command voltage from the three-phase command voltage outputted by the two-phase to three-phase converter.

5. A three-phase neutral point clamped power conversion process comprising:
a first three-phase to two-phase converting step of converting a three-phase detected current to a two-phase detected current of a d-axis detected current and a q-axis detected current;
a current control step of calculating a two-phase command voltage with a current control function of performing a PI control in accordance with a deviation between a d-axis command current and the d-axis detected current and a deviation between a q-axis command current and the q-axis detected current;

a two-phase to three-phase converting step of converting the two-phase command voltage to a three-phase command voltage;

a neutral point potential control step of calculating a neutral point control compensation quantity in accordance with a deviation between a positive side dc voltage and a negative side dc voltage, and adding the neutral point control compensation quantity to the three-phase command voltage thereby to calculate a corrected command voltage;

a limiting step of outputting a limiter processed command voltage by limiting, by a limiter, the corrected command voltage to or below a threshold value; and a second three-phase to two-phase converting step of outputting a feedback quantity by three-phase to two-phase conversion of the limiter processed command voltage;

wherein, in the current control step, an integral control is performed in accordance with the feedback quantity resulting from the three-phase to the two-phase conversion, the deviation between the d-axis command current and the d-axis detected current and the deviation between the q-axis command current and the q-axis detected current, wherein the limiter is configured to output the limiter processed command voltage to a processor to perform pulse width modulation processing, and wherein the limiter is configured to receive the corrected command voltage after a neutral point potential compensation quantity is added but before the processor performs the pulse width modulation processing.

6. The three-phase neutral point clamped power conversion apparatus as claimed in claim 2, wherein the corrected command voltage is determined by addition of the neutral point control compensation quantity to a quantity resulting from subtraction of a zero-phase command voltage from the three-phase command voltage outputted by the two-phase to three-phase converter.

7. The three-phase neutral point clamped power conversion apparatus as claimed in claim 3, wherein the corrected command voltage is determined by addition of the neutral point control compensation quantity to a quantity resulting from subtraction of a zero-phase command voltage from the three-phase command voltage outputted by the two-phase to three-phase converter.

8. The three-phase neutral point clamped power conversion apparatus as claimed in claim 1, wherein the current control section is configured to perform a proportional control in accordance with the deviation between the d-axis command current and the d-axis detected current and the deviation between the q-axis command current and the q-axis detected current without using the feedback quantity resulting from the three-phase to the two-phase conversion of the second three-phase to two-phase converter, and wherein the current control section performs the integral control by using the feedback quantity resulting from the three-phase to the two-phase conversion of the second three-phase to two-phase converter.

9. The three-phase neutral point clamped power conversion apparatus as claimed in claim 1, wherein the current control section includes a proportional control section to produce an output proportional to an input and an integral control section to produce an output from an input, the input of the proportional section is a control deviation which is one of the deviation the d-axis command current and the d-axis detected current or the deviation between the q-axis command current and the q-axis detected current, and the input of the integral section is a sum of the feedback quantity and the control deviation.

10. The three-phase neutral point clamped power conversion apparatus as claimed in claim 9, wherein the current control section includes a subtracting section to produce a difference between the feedback quantity and an output of the PI control of the current control section, a feedback gain section to multiply an output of the subtracting section by a feedback gain, and an adding section to add an output of feedback gain section to the control deviation which is one of the deviation the d-axis command current and the d-axis detected current and the deviation between the q-axis command current and the q-axis detected current.

11. The three-phase neutral point clamped power conversion apparatus as claimed in claim 1, wherein the three-phase neutral point clamped power conversion apparatus further comprises a process section configured to produce control signals to control switching devices arranged to produce one of a three-phase ac output or a dc voltage, and wherein the limiter processed command voltage produced by the limiter is a three-phase voltage inputted into the process section and into the second three-phase to two-phase converter.

12. The three-phase neutral point clamped power conversion apparatus as claimed in claim 1, wherein the first three-phase to two-phase converter is a current converter configured to convert the three-phase detected current to the two-phase detected current of a d-axis detected current and the q-axis detected current, and wherein the second three-phase to two-phase converter is a voltage converter configured to output the feedback quantity by the three-phase to two-phase conversion of the limiter processed three-phase command voltage.

13. A three-phase neutral point clamped power conversion apparatus comprising a control circuit which comprises:

a first three-phase to two-phase converter configured to convert a three-phase detected current to a two-phase detected current of a d-axis detected current and a q-axis detected current;

a current control section configured to calculate a two-phase command voltage with a current control function of performing a PI control in accordance with a deviation between a d-axis command current and the d-axis detected current and a deviation between a q-axis command current and the q-axis detected current;

a two-phase to three-phase converter configured to convert the two-phase command voltage to a three-phase command voltage;

a neutral point potential control section configured to calculate a neutral point control compensation quantity in accordance with a deviation between a positive side dc voltage and a negative side dc voltage, and to add the neutral point control compensation quantity to the three-phase command voltage thereby to calculate a three-phase corrected command voltage;

a limiter configured to output a limiter processed three-phase command voltage by limiting the three-phase corrected command voltage to or below a threshold value; and a second three-phase to two-phase converter configured to output a feedback quantity by three-phase to two-phase conversion of the limiter processed three-phase command voltage;

the current control section including a proportional control section to perform a proportional control based on a control deviation which is one of the deviation between the d-axis command current and the d-axis detected current or the deviation between the q-axis command current and the q-axis detected current without using the feedback quantity, and an integral control section to perform the integral control based on the control deviation by using the feedback quantity, wherein the limiter is configured to output the limiter processed three-phase command voltage to a processor to perform pulse width modulation processing, and wherein the limiter is configured to receive the three-phase corrected command voltage after a neutral point potential compensation quantity is added but before the processor performs the pulse width modulation processing.

14. The three-phase neutral point clamped power conversion apparatus as claimed in claim 2, wherein the three-phase neutral point clamped power conversion apparatus is arranged to convert a dc voltage to a three-phase ac voltage to be supplied to the motor as the load, and the three-phase neutral point clamped power conversion apparatus further comprises:

smoothing capacitors configured to divide the dc voltage and thereby to produce the positive side dc voltage, the negative side dc voltage and a neutral point dc voltage; and a group of switching devices configured to produce the three-phase ac output to be supplied to the motor, by using the positive side dc voltage, the negative side dc voltage and the neutral point dc voltage, wherein the processor is configured to receive the limiter processed command voltage which is a three phase voltage produced by the limiter, and to produce control signals to control the switching devices arranged to produce the three-phase ac output.

15. The three-phase neutral point clamped power conversion apparatus as claimed in claim 3, wherein the three-phase neutral point clamped power conversion apparatus is arranged to convert a three-phase ac voltage of the system to a dc voltage, and the three-phase neutral point clamped power conversion apparatus further comprises:

smoothing capacitors configured to divide the dc voltage and thereby to produce the positive side dc voltage, the negative side dc voltage and a neutral point dc voltage; and a group of switching devices configured to produce the dc voltage from the three-phase ac voltage of the system, wherein the processor is configured to receive the limiter processed command voltage which is a three phase voltage produced by the limiter, and to produce control signals to control the switching devices arranged to produce the dc voltage.

16. The three-phase neutral point clamped power conversion apparatus of claim 14, wherein the three-phase neutral point clamped power conversion apparatus further comprises:

a neutral point between one of the smoothing capacitors, which is a smoothing capacitor for the positive side dc voltage, and another of the smoothing capacitors, which is a smoothing capacitor for the negative side dc voltage.

17. The three-phase neutral point clamped power conversion apparatus as claimed in claim 16, wherein the neutral point potential control section is configured to increase the neutral point potential compensation quantity to compensate for a difference in initial charge quantities of the smoothing capacitors.

18. The three-phase neutral point clamped power conversion apparatus of claim 1, wherein the neutral point potential control section is configured to suppress current fluctuation when the corrected command voltage reaches the threshold value.

* * * * *